US007836781B1

(12) United States Patent
Chen

(10) Patent No.: US 7,836,781 B1
(45) Date of Patent: Nov. 23, 2010

(54) TORQUE-SETTING DEVICE

(75) Inventor: Xuan-Ren Chen, Taichung (TW)

(73) Assignee: Mikawa Co., Ltd., Taichung (TW)

( * ) Notice: Subject to any disclaimer, the term of this patent is extended or adjusted under 35 U.S.C. 154(b) by 0 days.

(21) Appl. No.: 12/434,662

(22) Filed: May 3, 2009

(51) Int. Cl.
*G01L 5/24* (2006.01)

(52) U.S. Cl. ........................................ 73/862.22

(58) Field of Classification Search .. 73/862.21–862.23
See application file for complete search history.

(56) References Cited

U.S. PATENT DOCUMENTS 2,343,380 A * 3/1944 Larson et al. ............ 73/862.21
2,374,217 A * 4/1945 Larson et al. ............ 73/862.21
2,682,796 A * 7/1954 Larson ........................ 81/479
6,334,377 B1 * 1/2002 Wu ............................ 81/478

* cited by examiner

*Primary Examiner*—Lisa M Caputo
*Assistant Examiner*—Octavia Davis
(74) *Attorney, Agent, or Firm*—Banger Shia

(57) ABSTRACT

A torque-setting device includes a handle with grooves defined in an internal side, a driving unit attached to the handle, a strain gauge connected to the driving unit, a strain spring abutted against the strain gauge, a nut abutted against the strain spring, an axle and a knob. The axle includes a thread. The thread is engaged with the nut. The knob includes a tooth on an external side. The knob is operable to rotate the axle relative to the nut, thus moving the nut relative to the strain spring to set a value of torque. The knob is movable between a first position where the tooth is inserted in one of the grooves to retain the value of torque and a second position where the tooth is removed from the grooves to allow the rotation of the knob and therefore the rotation of the axle.

11 Claims, 8 Drawing Sheets

TORQUE-SETTING DEVICE

BACKGROUND OF INVENTION

1. Field of Invention

The present invention relates to a torque-providing tool and, more particularly, to a torque-setting device for use in a torque-providing tool.

2. Related Prior Art

There are torque-providing tools such as wrenches and screwdrivers. Such a torque-providing tool includes a handle and a driving unit connected to the handle. The driving unit can be engaged with a bit, and the bit can be engaged with a fastener such as axle and a nut. Thus, the torque-providing tool is operable to provide torque to the fastener. To provide certain values of torque to certain fasteners, there have been devised torque-indicating devices. Such a torque indicating device includes a strain gauge connected to the handle or the driving unit, a display and a circuit for connecting the strain gauge to the display. Thus, a value of torque is converted to strain in the strain gauge. The circuit calculates the strain and sends a corresponding signal to the display, and the display shows the value of torque.

To warn a user of a fact that a value of torque has been reached, there have been devised torque-setting devices so that a click is given when a corresponding value of torque is reached. Such a torque-setting device includes a strain spring connected to the strain gauge, an axle inserted in the strain spring and a nut engaged with the axle and abutted against the strain spring. Rotation of the axle relative to the handle is not allowed.

When the nut is rotated relative to the axle, the extent to which the strain spring is compressed is changed, and a value of torque is set. However, the setting of the value of torque is not precise. Moreover, the nut might be rotated accidentally, thus setting an undesired value of torque.

The present invention is therefore intended to obviate or at least alleviate the problems encountered in prior art.

SUMMARY OF INVENTION

It is the primary objective of the present invention to provide a precision, reliable torque-setting device.

To achieve the foregoing objective, the torque-setting device includes a handle, a driving unit, a strain gauge, a strain spring, a nut, an axle and a knob. The handle includes grooves defined in an internal side thereof. The driving unit is attached to an end of the handle. The strain gauge is connected to the driving unit. The strain spring is abutted against the strain gauge within the handle. The nut is abutted against the strain spring. The axle includes a thread formed near a first end and teeth formed near an opposite second end. The thread is engaged with the nut. The knob is movable on the axle and within the handle between a first position and a second position. The knob includes teeth on an internal side thereof and a tooth on an external side. The teeth on the internal side of the knob are engaged with the teeth of the axle so that the knob is operable to rotate the axle relative to the nut, thus moving the nut relative to the strain spring to set a value of torque. The tooth on the external side of the knob is inserted in one of the grooves of the handle to retain the value of torque when the knob is in the first position. The tooth on the external side of the knob is removed from the grooves of the handle to allow the rotation of the knob and therefore the rotation of the axle when the knob is in the second position.

Other objectives, advantages and features of the present invention will become apparent from the following description referring to the attached drawings.

BRIEF DESCRIPTION OF DRAWINGS

The present invention will be described via detailed illustration of two embodiments referring to the drawings.

DETAILED DESCRIPTION OF EMBODIMENTS

Figure 1:
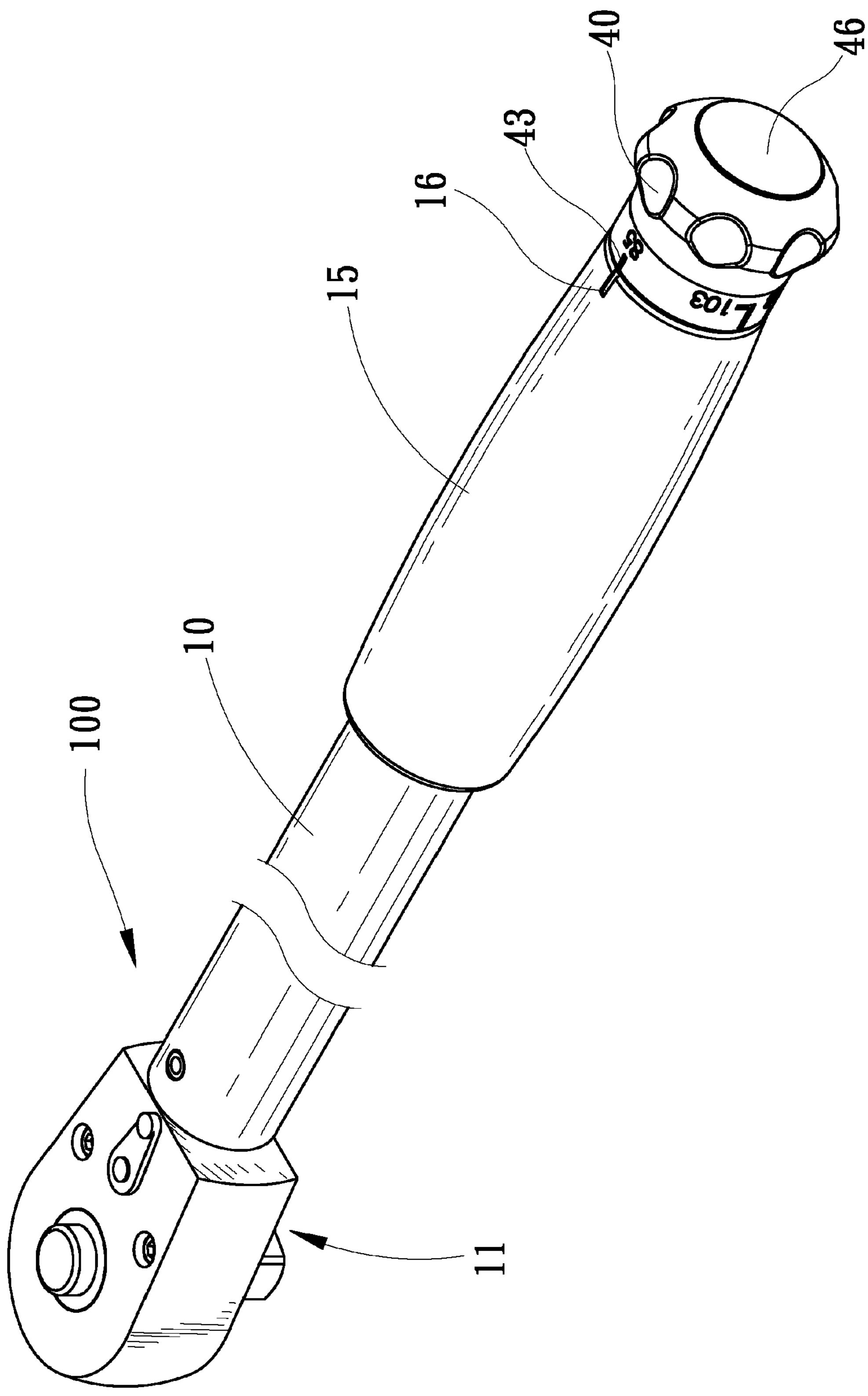
FIG. 1 is a perspective view of a tool equipped with a torque-setting device according to the first embodiment of the present invention.

Referring to FIG. 1, a tool 100 is equipped with a torque-setting device according to a first embodiment of the present invention. The tool 100 includes a handle 10, a driving unit 11 connected to an end of the handle 10 and a sleeve 15 provided on an opposite end of the handle 10. The handle 10 and the sleeve 15 are hollow. A slot 12 is longitudinally defined in the handle 10.

Figure 2:
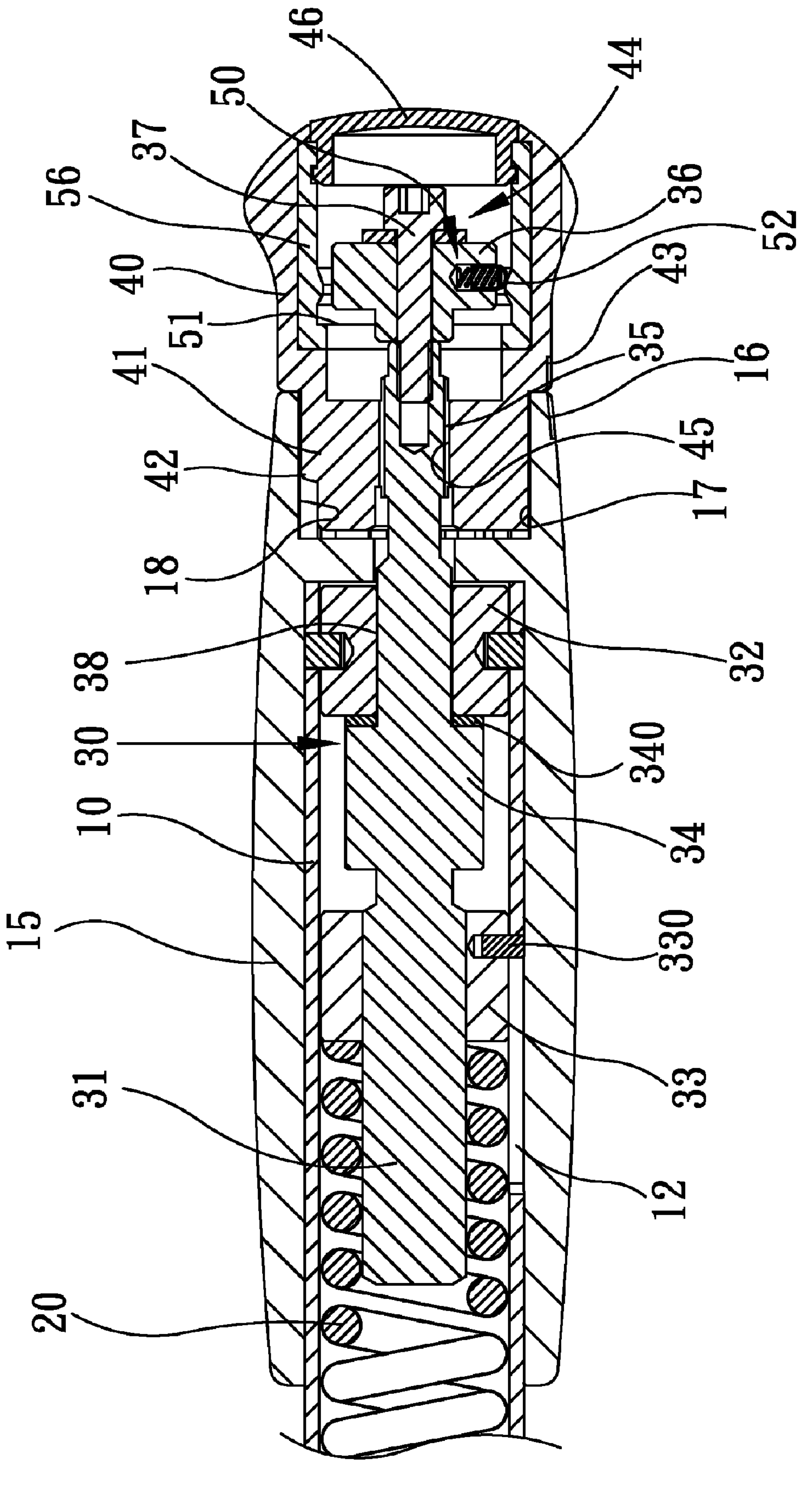
FIG. 2 is a cross-sectional view of the torque-setting device shown in FIG. 1.

Referring to FIG. 2, the torque-setting device includes a spring 20 in contact with a strain gauge that is not shown or described in detail for clarity of the drawings and briefness of the description. A pushing element 33 is disposed in the handle 10. The pushing element 33 is preferably a nut. A pin 330 includes an end movably disposed in the slot 12 and another end driven into the pushing element 33. Thus, the pushing element 33 is movable but not rotational in the handle 10.

An axle 30 is formed with a thread 31 formed near a first end thereof, a block 34 formed next to the thread 31, a shank 38 formed next to the block 34 and teeth 35 formed near an opposite second end thereof. The thread 31 is engaged with the thread of the pushing element 33 within the handle 10. The block 34 and the shank 38 are located in the handle 10 while the teeth 35 are located outside the handle 10. A bushing 32 is mounted on the shank 38 within the handle 10. A washer 340 is provided between the bushing 32 and the enlarged block 34. Two pins are driven into the bushing 32 through the handle 10, thus attaching the bushing 32 to the handle 10. An axle 37 is driven into the second end of the axle 30 through a restraining element 36, thus securing the restraining element 36 to the axle 37.

The sleeve 15 includes an annular rib formed on an internal side thereof, thus dividing the interior thereof into a deep cavity for receiving the handle 10 and a shallow cavity 17 for receiving some elements to be described. The teeth 35 are located in the shallow cavity 17. As clearly shown in FIGS. 6 and 7, grooves 18 are defined in the wall of the shallow cavity 17. A mark 16 is formed on or defined in an external side of the sleeve 15.

A knob 40 is made hollow, i.e., including a space 44 defined therein. Moreover, the knob 40 includes a shank 41 formed at an end, a tooth 42 formed on the shank 41, marks 43 formed on or defined in an external side thereof and teeth 45 formed on an internal side. The shank 41 is rotationally inserted in the shallow cavity 17 before the restraining element 36 is secured to the axle 30. The tooth 42 can be inserted in a selected one of the grooves 18 to keep knob 40 in a desired position relative to the sleeve 15. The marks 43 are provided corresponding to the grooves 18. A selected one of the marks 43 can be aligned with the mark 16 to indicate a selected value of torque. The teeth 45 are engaged with the teeth 35.

A plug 46 is fit in the lining 56. Thus, the other elements are protected from contamination. The plug 46 can be replaced with a cap mounted on the knob 40 in another embodiment.

Figure 3:
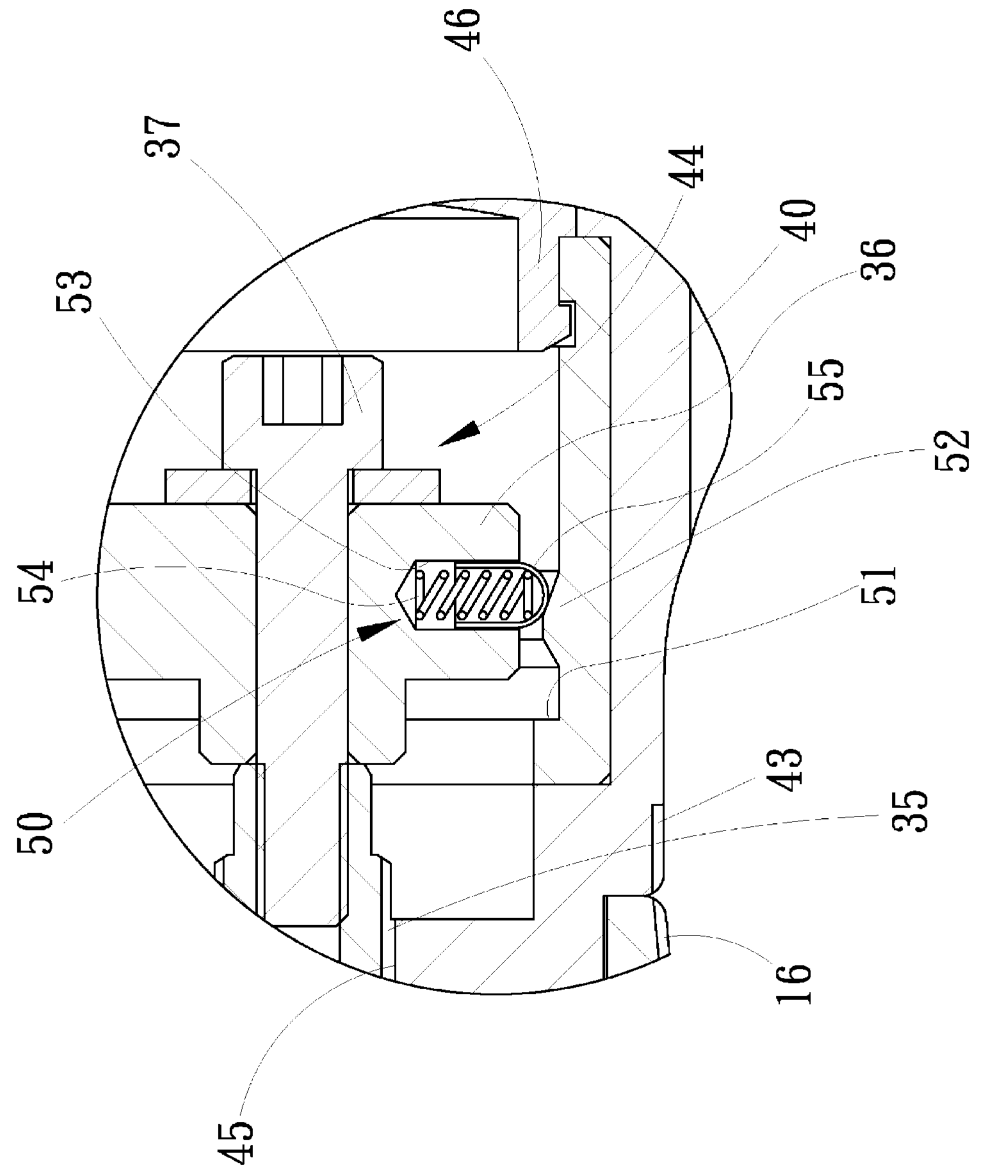
FIG. 3 is an enlarged, partial view of the torque-setting device shown in FIG. 2.

Referring to FIG. 3, a positioning unit 50 includes a lining 56 and a spring-biased detent assembly. The lining 56 is disposed in the space 44 of the knob 40 so that they cannot be rotated or moved relative to each other. A plug 46 is fit in the lining 56 to protect the other elements from dirt. The plug 46 can be replaced with a cap mounted on the knob 40 in another embodiment. In fact, the lining 56 and the knob 40 can be made one in another embodiment. The lining 56 includes an annular flange 51 formed on an internal side thereof at an end and an annular rib 52 formed on the internal side thereof near the annular flange 51.

The spring-biased detent assembly includes a spring 54 disposed in a recess 53 defined in the restraining element 36 and a detent 55 biased with the spring 54. The detent 55 is formed like a cap for receiving a portion of the spring 54. The detent 55 is in contact with the internal side of the lining 56.

Figure 6:
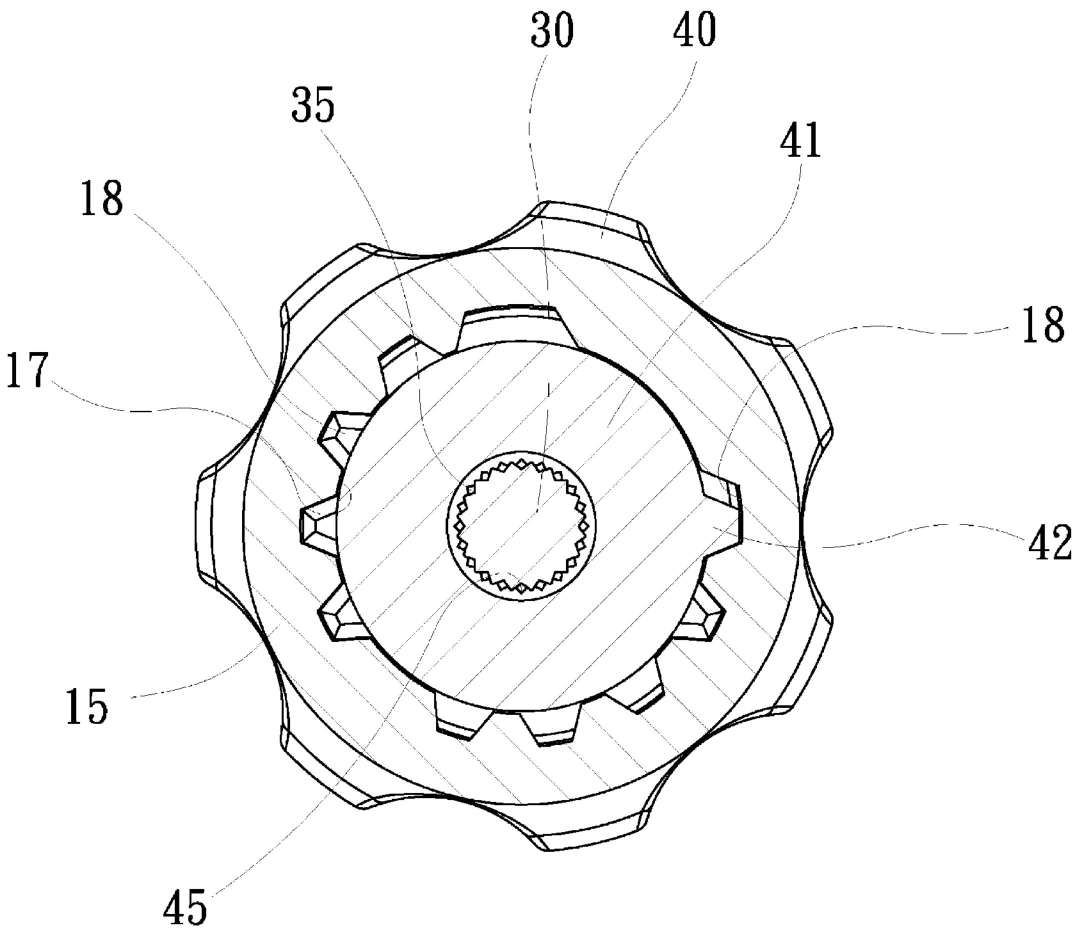
FIG. 6 is another cross-sectional view of the torque-setting device shown in FIG. 2.

Referring to FIGS. 2, 3 and 6, the annular rib 52 is abutted against the spring-biased detent assembly. The tooth 42 is retained in one of the grooves 18 so that the knob 40 is prevented from rotation relative to the sleeve 15. Hence, the axle 30 cannot be rotated relative to the pushing element 33. Accordingly, the pushing element 33 cannot be moved relative to the strain spring 20. Therefore, a value of torque is set and retained.

Figure 4:
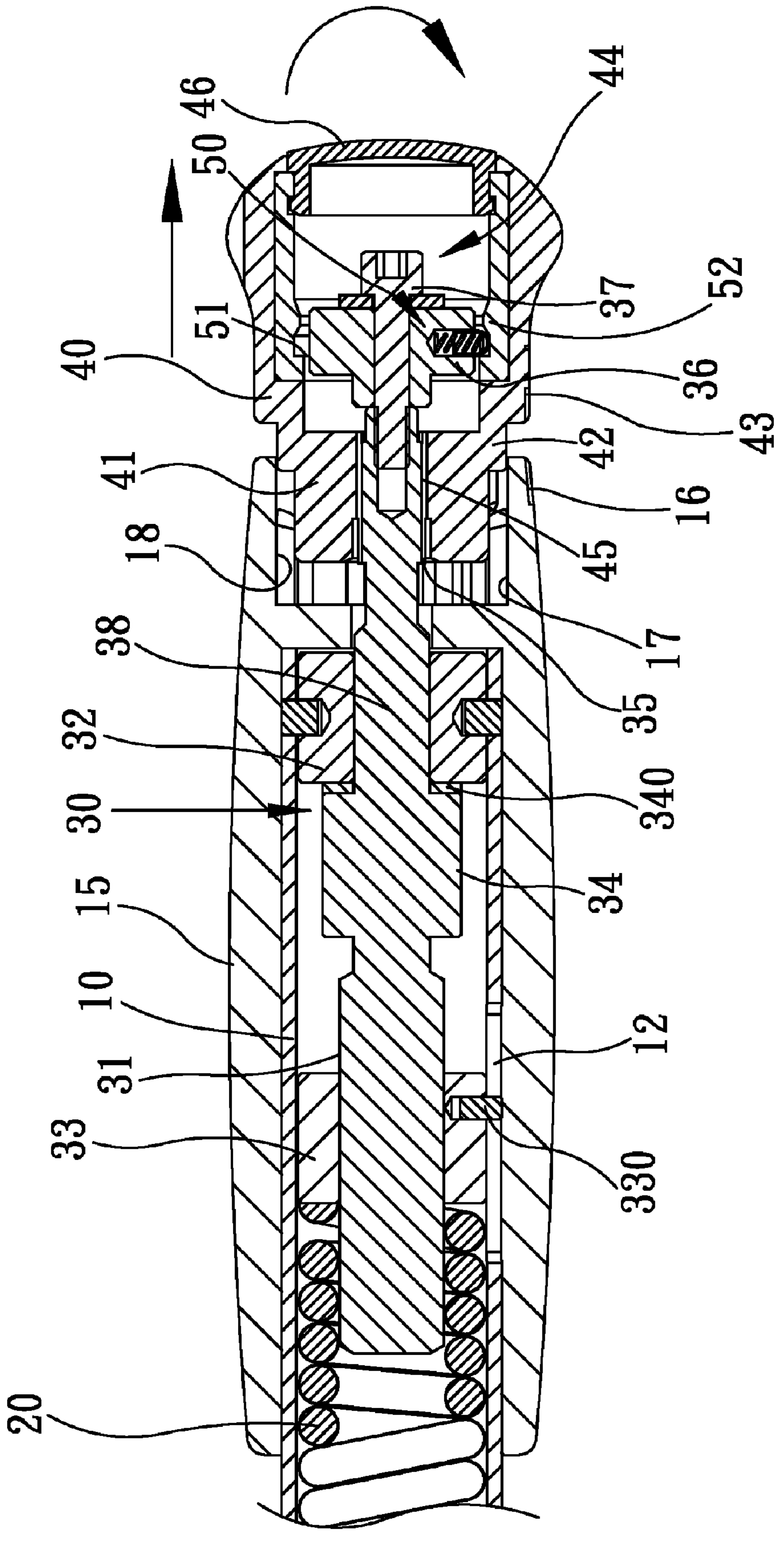
FIG. 4 is a cross-sectional view of the torque-setting device in another position than shown in FIG. 2.
Figure 5:
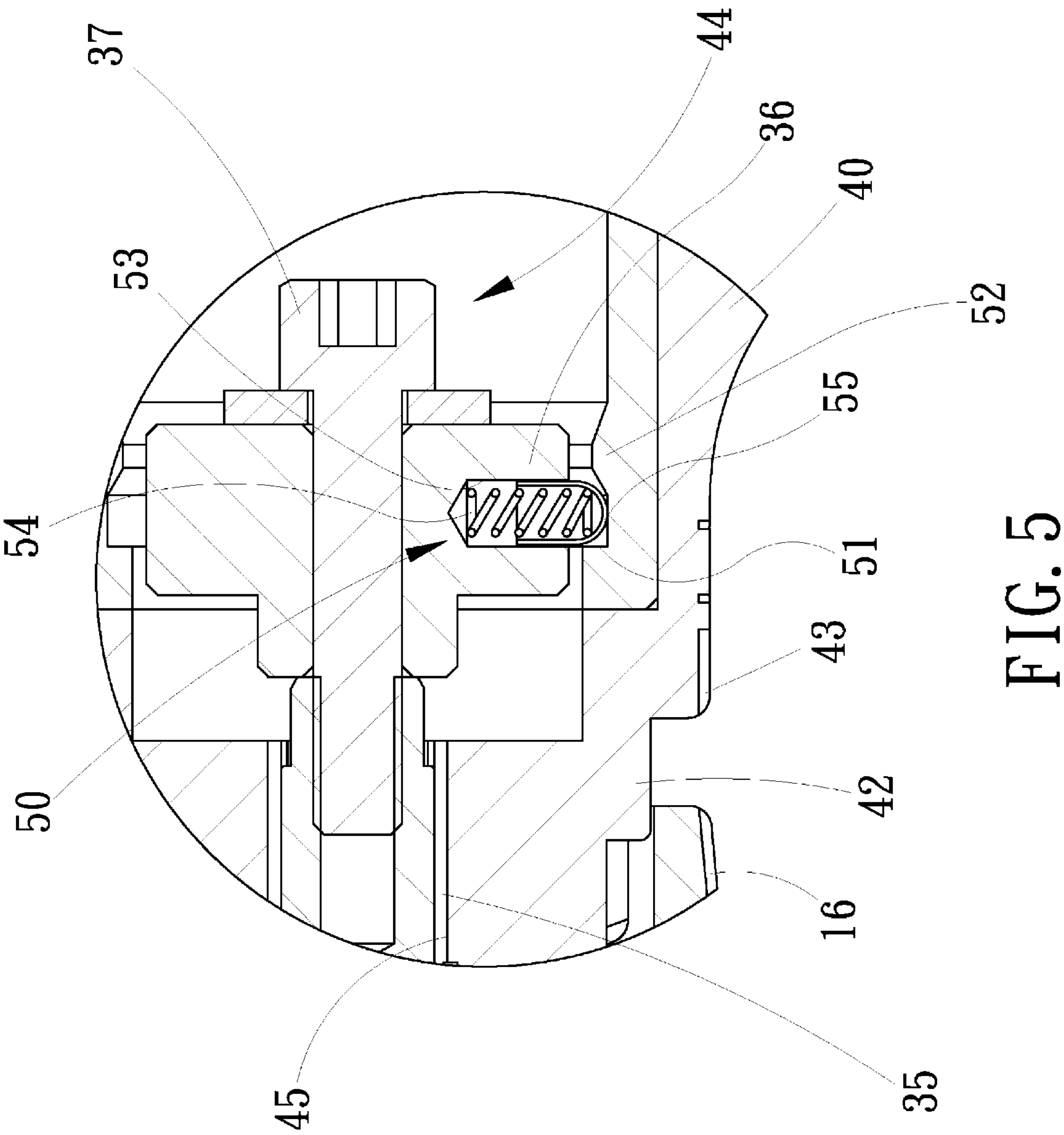
FIG. 5 is an enlarged, partial view of the torque-setting device shown in FIG. 4.
Figure 7:
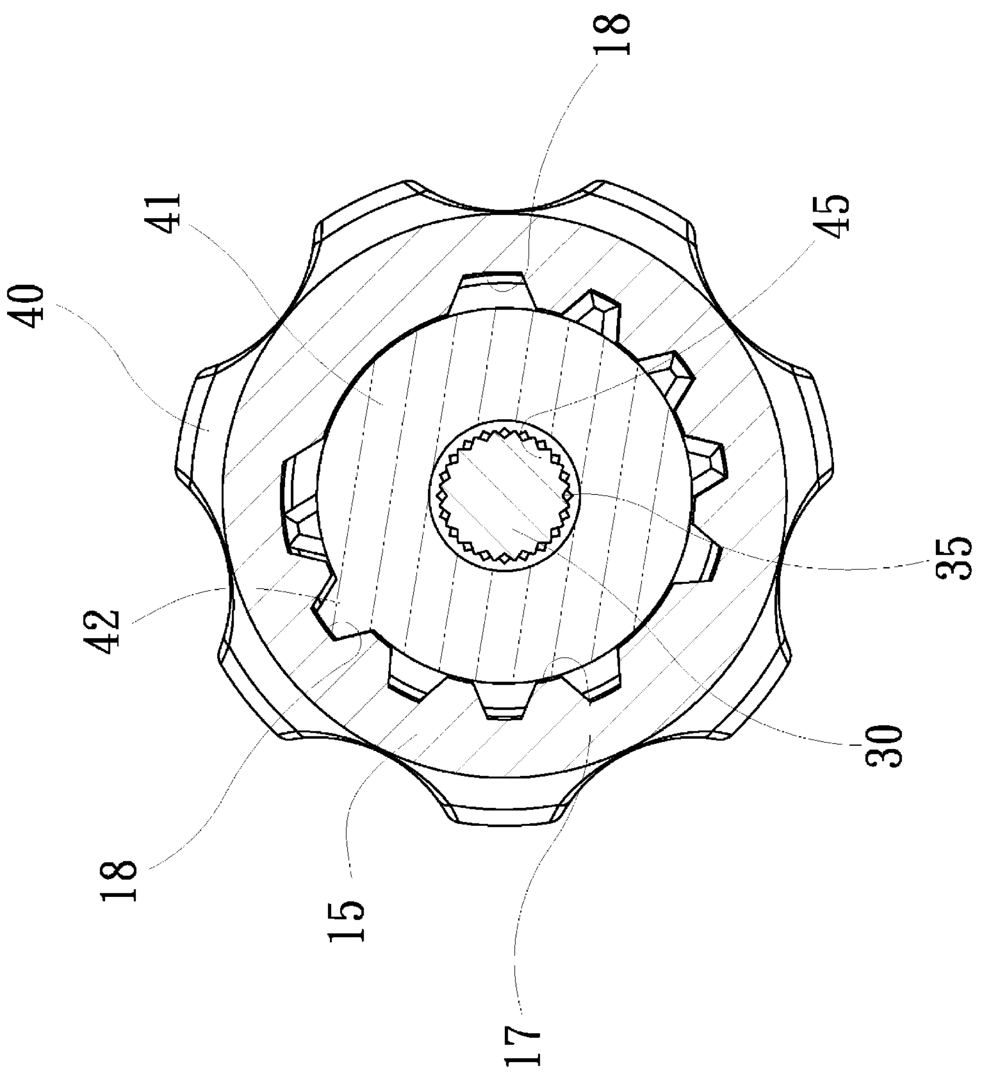
FIG. 7 is a cross-sectional view of the torque-setting device in another position than shown in FIG. 6.

Referring to FIGS. 4, 5 and 7, the knob 40 is moved relative to the sleeve 15 after overcoming the force exerted on the annular rib 52 from the spring-biased detent assembly. The tooth 42 is located outside any of the grooves 18 so that the knob 40 can be rotated relative to the sleeve 15. Hence, the axle 30 can be rotated relative to the pushing element 33. Accordingly, the pushing element 33 can be moved relative to the strain spring 20. Therefore, another value of torque can be set. The knob 40 can be returned to the position shown in FIGS. 2, 3 and 6 to retain the new value of torque.

Figure 8:
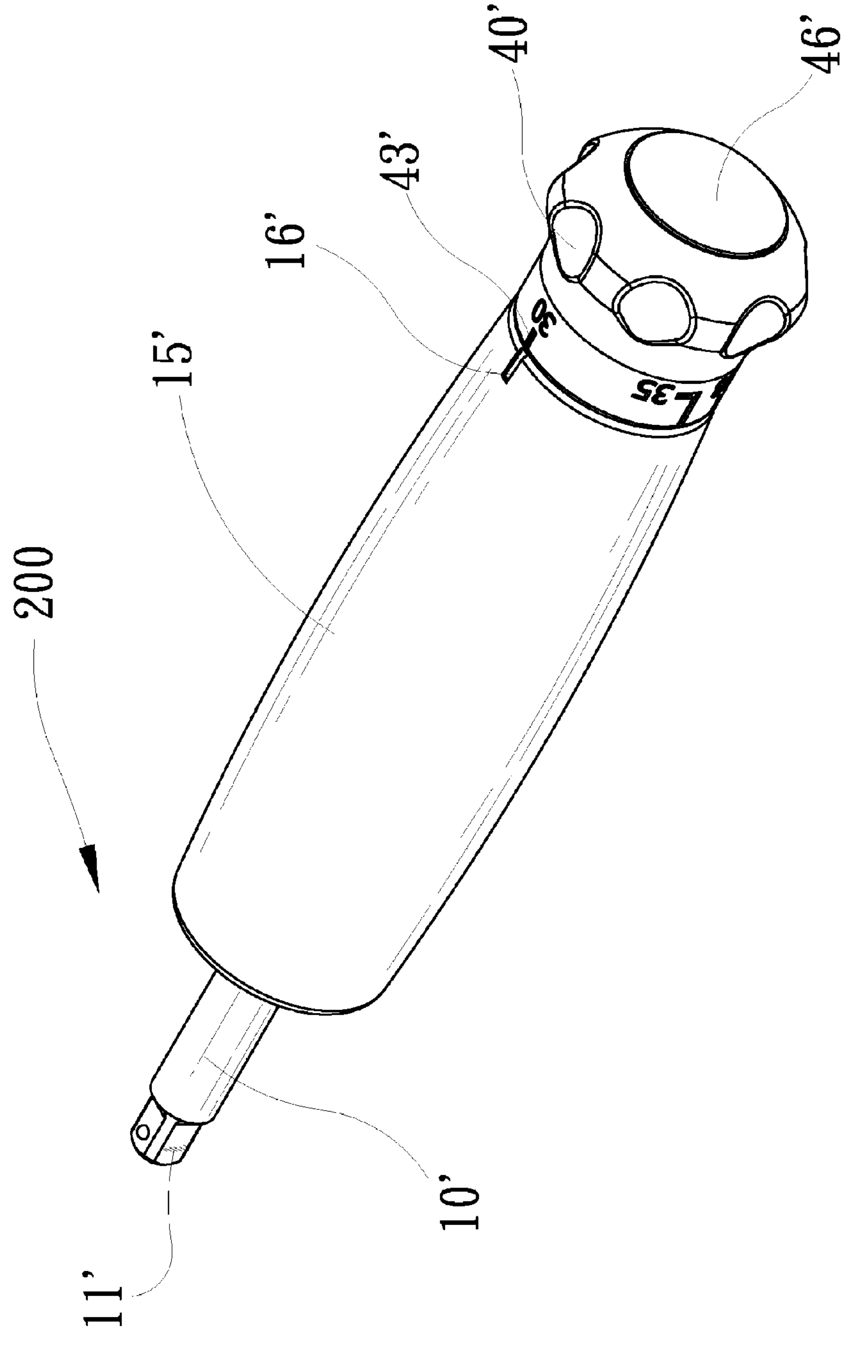
FIG. 8 is a perspective view of a tool equipped with a torque-setting device according to the first embodiment of the present invention.

Referring to FIG. 8, there is shown a tool 200 according to a second embodiment of the present invention. The tool 200 is like the tool 100 except including a different driving unit 11' and different values of torque marked on the knob 40.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A torque-setting device comprising:

a handle comprising grooves defined in an internal side thereof;

a driving unit attached to an end of the handle and connected to a strain gauge;

a strain spring abutted against the strain gauge within the handle;

a pushing element movably but not rotationally located in the handle and abutted against the strain spring;

an axle including a portion rotationally but not movably located in the handle and engaged with the pushing element so that rotation of the axle relative to the pushing element causes movement of the pushing element relative to the axle and hence the strain spring to set a value of torque; and a knob formed with a tooth and connected to another portion of the axle, wherein the knob is operable to rotate the axle relative to the pushing element, wherein the knob is movable between a first position where the tooth is inserted in one of the grooves of the handle to retain the value of torque and a second position where the tooth is removed from the grooves to allow the rotation of the knob.

2. The torque-setting device according to claim 1, wherein the pushing element is movably but not rotationally disposed in the handle and formed with a thread, and the axle comprises a thread engaged with the nut.

3. The torque-setting device according to claim 1 comprising a bushing for supporting the axle, wherein the axle comprises a block abutted against the bushing.

4. The torque-setting device according to claim 1, wherein the knob comprises marks each representing a value of torque, and the handle comprises a mark for alignment with a selected one of the marks of the knob.

5. The torque-setting device according to claim 1 comprising a sleeve provided on the handle, wherein the grooves of the handle are defined in an internal side of the sleeve.

6. The torque-setting device according to claim 1 comprising a restraining element attached to the axle.

7. The torque-setting device according to claim 1 comprising a plug fit in the handle to protect the other elements.

8. The torque-setting device according to claim 6 comprising a spring-biased detent assembly connected to the restraining element, wherein the knob comprises an annular flange and an annular rib on an internal side for cooperation with the spring-biased detent assembly to position the knob.

9. The torque-setting device according to claim 1, wherein the axle comprises teeth thereon, and the knob comprises teeth engaged with the teeth of the axle.

10. The torque-setting device according to claim 2 comprising a pin with an end driven in the pushing element, wherein the handle comprises a slot for movably receiving another end of the pin.

11. The torque-setting device according to claim 3 comprising a washer provided between the block and the bushing.

* * * * *